3,483,309
SNAP-ON CABLE CLAMP
Kurt Carl Kerseg, La Crescenta, and Rafael Garcia, Rosemead, Calif., assignors to International Telephone and Telegraph Corporation, New York, N.Y., a corporation of Delaware
Filed May 22, 1968, Ser. No. 731,060
Int. Cl. H02g 3/18
U.S. Cl. 174—65   10 Claims

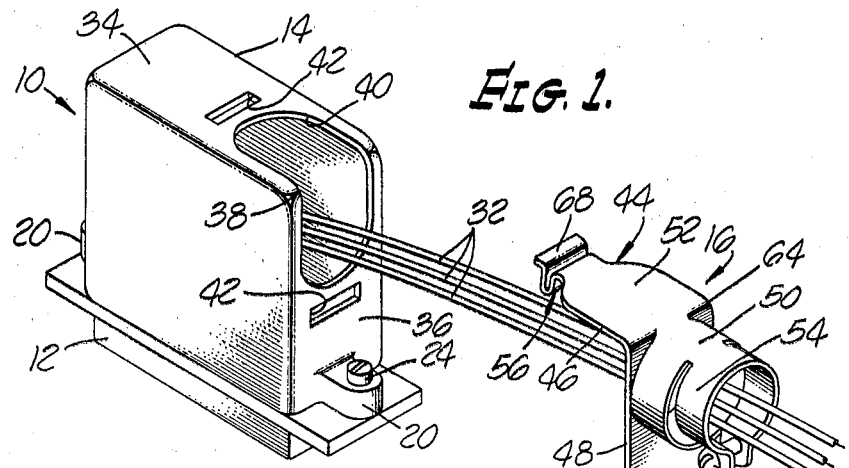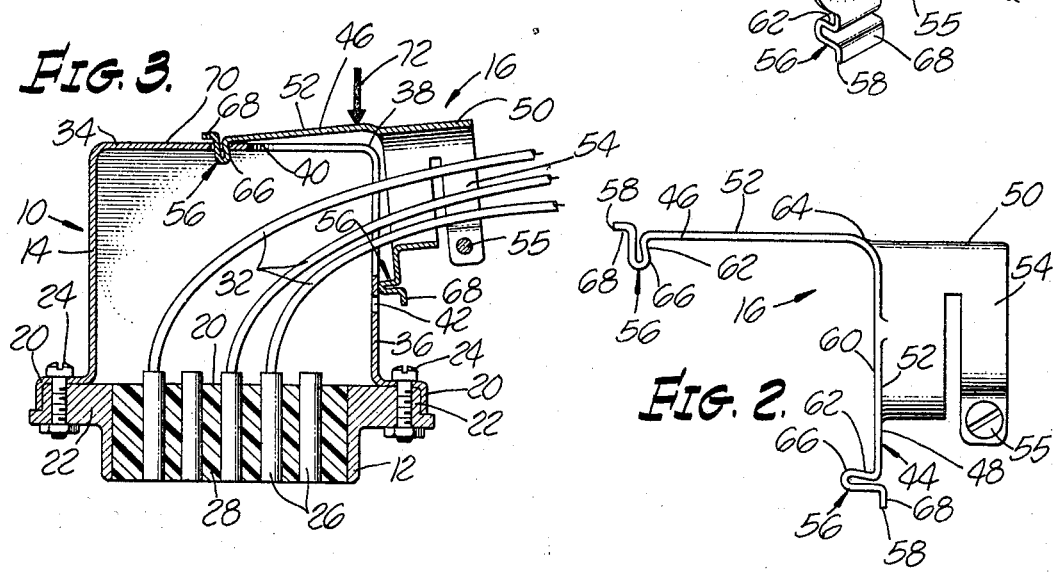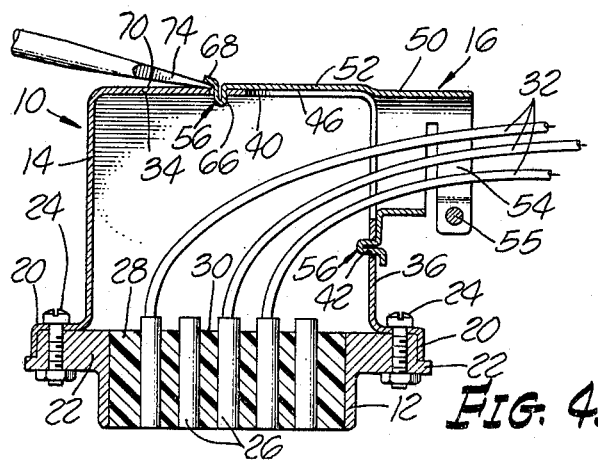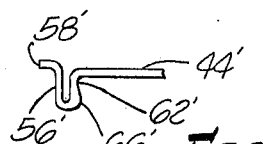

ABSTRACT OF THE DISCLOSURE

A cable clamp assembly in which a cable clamping member is easily and rapidly secured to a housing, such as an electrical junction box or appliance cover. The cable clamping member includes a resilient plate which embodies a pair of projections which correspond to a pair of slots in the housing. The projections are caused to snap into the slots upon applying pressure on the upper surface of the resilient plate.

BACKGROUND OF THE INVENTION

This invention relates generally to a cable clamp assembly and, more particularly, to such an assembly in which a cable clamping member is quickly snap fitted to the housing of the assembly.

It is desirable for an electrical connector junction box that a cable clamp be provided which may be tightly secured to the wires of the cable so as to remove stain from the cable wires when the connector is disengaged from a mating connector part. It is further desirable that the cable clamp be a separable part which is quickly assembled and disassembled from the connector junction box so that wire connections may be made to the connector either before or after the securement of the cable clamp to the junction box, thus providing greater latitude in wiring installation procedures and, as a consequence, a reduction in labor costs. While a nut is normally utilized for securing a cable clamp to a junction box, the threading and unthreading of such nut is time consuming and, thus, not entirely satisfactory for expeditious wiring procedures. Thus, what is desired is some other form of securing means which will permit quick assembly and disassembly of a separable cable clamp member to a junction box of an electrical connector. While the present invention is described herein specifically in connection with a junction box of an electrical connector, it is to be understood that the invention could be applied to other receptacle housings such as appliance covers wherein it is desired to secure a cable clamping device to such a cover.

SUMMARY OF THE INVENTION

In accordance with the principal aspect of the present invention, there is provided a cable clamp assembly in which a separable cable clamping member is quickly assembled or disassembled by means of a snap action fit to the housing of the assembly. The cable clamping member includes a resilient mounting plate which is provided with projections adjacent to the opposite ends thereof which are adapted to be snap fitted into corresponding slots in the housing of the assembly. The relative spacing between the projections and slots is such that when one projection of the cable clamping members is engaged in one of the housing slots, the opposite projection bears against the outer surface of the housing a slight distance from the corresponding slot therein. When pressure is applied upon the outer surface of the resilient mounting plate, the latter mentioned projection snaps into the adjacent slot thus causing the cable clamping member to be securely fastened to the housing. Preferably a portion of the mounting plate extends above the surface of the housing to provide a tab under which a rigid object such as a screw driver may be inserted to facilitate disengagement of the cable clamping member from the housing.

BRIEF DESCRIPTION OF THE DRAWING

FIG. 1 is an exploded perspective view of the cable clamp assembly of the invention, as applied to an electrical connector receptacle;

FIG. 2 is a side elevation of the cable clamping member shown in FIG. 1;

FIG. 3 is a longitudinal vertical section through the cable clamp assembly of FIG. 1, with the cable clamping member being shown partially assembled to the housing of the assembly;

FIG. 4 is a longitudinal vertical section through the cable clamp assembly of FIG. 1, but showing the cable clamping member completely assembled to the housing, and also showing a screw driver inserted under one end of the cable clamping member for disassembling the latter from the housing; and FIG. 5 is a fragmentary side elevation of the end portion of a modified form of the cable clamping member.

DESCRIPTION OF THE PREFERRED EMBODIMENT

Referring now to FIGS. 1 to 4 of the drawing in detail, wherein like reference characters designate corresponding parts throughout the various views, there is illustrated one form of the cable clamp assembly of the invention, generally designated 10. The assembly includes an electrical connector receptacle 12, a housing or junction box 14 for the receptacle, and a cable clamping member 16. The housing 14 is provided with flanges 20 at opposite ends thereof which overlie complementary projections 22 on the connector receptacle 12. The housing is fixedly secured to the receptacle 12 by means of nut and bolt assemblies 24. A plurality of female electrical contact members 26 are mounted in a suitable insulating base 28 positioned in the receptacle 12, the contact members 26 opening at the bottom of the base so that a mating electrical connector plug, not shown, may be connected thereto. The upper portions of the contact members 26 extend above the upper surface 30 of the base 28 for connection to a plurality of cable conductors 32.

The housing 14 of the assembly includes a pair of walls 34 and 36 which are normal to each other and join at a corner 38. The walls are provided with cut-out portions adjacent to corner 38 to provide an opening 40 through which the cable conductors 32 extend. Elongated, transversely extending, generally parallel slots 42 are formed in each of the walls 34 and 36 of the housing and are spaced from the ends of the opening 40.

The cable clamping member 16 includes a resilient plate 44 formed of a suitable sheet metal which is bent to provide two sections 46 and 48 which are normal to each other and are complementary to the walls 34 and 36 of the housing 14. A cylindrical section 50 extends outwardly from the upper or outer surface 52 of the plate 44 with its longitudinal axis generally parallel to the plate section 46. The cylindrical section 50 includes at its end a split circular ring portion 54 which is connected by a nut and bolt assembly 55 which may be tightened to securely clamp the ring portion 54 down upon the cable conductors 32 when the cable clamping member 16 is assembled to the housing 14.

A pair of generally U-shaped projections 56 are formed in the plate 44 of the clamping member adjacent to the ends 58 thereof and extend outwardly from the lower surface 60 of the plate. The outer end of leg 62 of each projection which is closest to the corner 64 of the right plate 44, is bent laterally toward the corner to provide a latch 66 which serves to retain the projections in the slots 42 after the clamping member is secured to the housing. The portions of the plate 44 adjacent to the ends 58 thereof extend upwardly from the upper surface 52 of the plate and laterally outwardly to provide tabs 68 which will be spaced from the outer or upper surface 70 of the housing when the clamping member 16 is assembled thereto. These tabs facilitate disassembly of the clamping member from the housing as will be described later.

In order to assemble the cable clamping member 16 to the housing 14, one of the projections 56 of the clamping member is inserted into one of the slots 42, for example, in the slot in the upper wall 34 of the housing as seen in FIG. 3. The width of each of the slots 42 is sufficient to permit the projections to be loosely inserted therein and the distance between the slots is slightly greater than the distance between the projections, so that the projection adjacent to the housing wall 36 engages the wall just short of the slot 42 therein. In order to fully assemble the clamping member 16 to the housing, pressure is exerted against the upper surface 52 of the resilient mounting plate 44, preferably in the direction indicated by arrow 72 in FIG. 3. This will cause the plate 44 to be deformed until the lower projection snaps into the slot 42 in the wall 36 as shown in FIG. 4. The latch portions 66 of the projections 56 facilitate the frictional engagement of the projections with the sides of the slots 42 closest to the corner 38 of the housing. The pressure required to snap fit the clamping member 16 to the housing may be exerted by merely the user pressing against the outer surface of the plate 44 with his thumb. Thus, it can be appreciated that the cable clamping member 16 of the present invention may be rapidly and easily assembled to the housing 14 without the requirement of any special tools.

The clamping member 16 may be readily disassembled from the housing 14 by merely inserting the end 74 of a screw driver or other similar tool under one of the tabs 68 of the plate 44 as seen in FIG. 4 and twisting the screw driver slightly to effect withdrawal of the projection from the corresponding slot 42 in the housing. Once one of the projections is withdrawn from the housing, the clamping member may be readily removed due to the loose fit of the other projection in the corresponding housing slot.

FIG. 5 illustrates a modified form of a projection 56' which may be employed on a clamping member plate 44' in which the latch 66' is in the form of a bead which extends laterally outwardly from the leg 62'. This is in contrast to the clamping member 16 in FIGS. 1 to 4 in which the latch 66 is provided by appropriately bending the leg 62 of the projection. Obviously other forms of projections could be provided in accordance with the present invention. Moreover, the invention is not applicable only to right angle clamping members such as illustrated in the drawing, since obviously the invention could be embodied in any form of a mounting plate. For example, the mounting plate 44 could be flat in which case the corresponding slots in the housing would be provided on one coplanar wall of the housing.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures and devices.

What is claimed is:

1. A cable clamp assembly comprising: a housing having an opening therein through which a cable is adapted to be extended; a cable clamping member including a base plate having upper and lower surfaces and a cable clamp extending outwardly from the upper surface of said plate; said plate having opposite ends and being provided with projections extending outwardly from the lower surface thereof adjacent to said ends; a pair of slots in said housing each of a sufficient size to receive a plate projection therein, said slots being spaced a distance apart slightly greater than the distance between said projections when only one of said projections is engaged in a corresponding slot; and said plate being sufficiently resilient so that upon exertion of pressure on the upper surface thereof both of said projections will become engaged in said slots thereby securing the cable clamping member to said housing.

2. A cable clamp assembly as set forth in claim 1 wherein each projection is a generally U-shaped formed portion of said plate.

3. A cable clamp assembly as set forth in claim 1 including latch means on said projections for retaining the latter in said slots.

4. A cable clamp assembly as set forth in claim 3 wherein said latch means is provided on the sides of said projections closest to each other.

5. A cable clamp assembly as set forth in claim 2 wherein a portion of the legs of said U-shaped projections closest to each other are formed laterally to provide latch means which serve to retain said projections in said slots.

6. A cable clamp assembly as set forth in claim 1 wherein the ends of said plates project upwardly and laterally outwardly so as to provide outer end tabs spaced from the surface of said housing.

7. A cable clamp assembly as set forth in claim 1 wherein said housing includes two walls generally normal to each other and terminating at a corner; said plate having two sections generally normal to each other and complementary to said walls; said slots being each formed in a respective one of said walls; and said projections being each provided on a respective one of said plate sections.

8. A cable clamp assembly as set forth in claim 1 wherein said projections extend across said plate in generally parallel relationship to each other; and the adjacent edges of said slots are generally parallel to each other and to said projections.

9. A cable clamp assembly as set forth in claim 7 including latch means on the sides of said projections closest to said corner for retaining said projections in said slots; said projections extending transversely across said plate sections in generally parallel relationship to each other; and the edges of said slots closest to said corner being generally parallel to each other and to said projections.

10. A fastener assembly comprising: a wall and a plate adapted to be fastened to said wall; said plate embodying a pair of spaced projections extending outwardly from the lower surface thereof; a pair of slots in said wall each of a sufficient size to freely receive therein a plate projection, said slots being spaced a distance apart slightly greater than the distance between said projections when only one of said projections is engaged in a corresponding slot; and said plate being sufficiently resilient so that upon exertion of pressure on the upper surface thereof when said one projection is engaged in a slot, the other projection will snap into its corresponding slot thereby securely fastening said plate to said wall.

References Cited

UNITED STATES PATENTS

| | | | |
|---|---|---|---|
| 1,129,973 | 3/1915 | Gauthier | 285—158 X |
| 2,413,927 | 1/1947 | Robertson | 285—158 X |

LEWIS H. MYERS, Primary Examiner

D. A. TONE, Assistant Examiner

U.S. Cl. X.R.

285—128